Patented Sept. 9, 1930

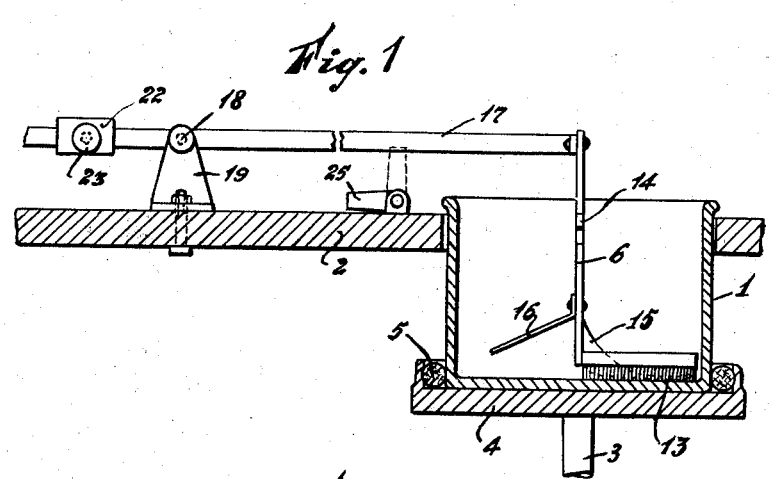
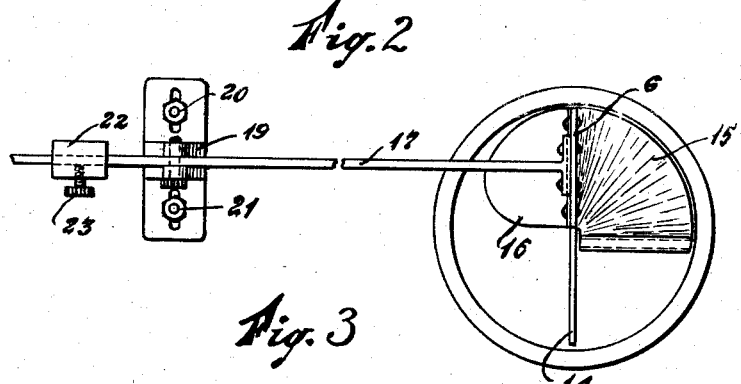
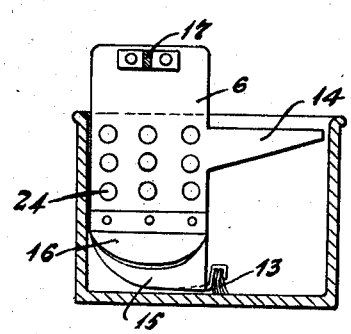

1,775,457

UNITED STATES PATENT OFFICE

MAGNUS HANSEN, OF TILBURG, NETHERLANDS

MIXING DEVICE

Application filed June 22, 1929, Serial No. 373,048, and in the Netherlands June 25, 1928.

The invention relates to an apparatus for mixing and keeping mixed a liquid and substances precipitating in the same, such for instance as dyes in shoe manufactories.

The apparatus according to the invention substantially comprises a mixing vessel which may be actuated rotatably and an agitating or mixing device arranged in this vessel which device is at rest in the direction of movement of the vessel, but which is so disposed that it may move up and down, vertically, and on actuating the apparatus may rest upon the precipitated mass and gradually by means of a brush or scratcher may scrape off and mix the mass. The mixing apparatus having arrived in its lowest position it may rest upon the bottom or may be kept by a cam or some other abutment in a certain lowest position, just free from the bottom.

The movement of the mixing apparatus in vertical direction may be enabled by a vertical guiding, but since as a result of the power exerted on the same by the liquid a friction will occur in the guiding, it is possible that the up and down movement is hindered. A better embodiment of the invention is where the mixing apparatus is secured to a lever rotatable around a horizontal shaft, by means of which construction no detrimental friction may occur. Moreover, such a device has the advantage that the mixing apparatus may be taken easily from the mixing vessel.

In the drawings the invention is explained by two embodiments.

Fig. 1 is a section of an embodiment of my invention;

Fig. 2 is a top view of the device of Fig. 1;

Fig. 3 is a cross section of same.

In the drawings the mixing vessel 1 is arranged in a hole of the working table 2 on a disc 4 at the top end of a vertical spindle 3, on which the vessel is centered and fixed by the aid of a ring 5 of rubber.

A stirring blade 6 is attached to a lever 17 rotatable around a horizontal shaft 18. This shaft is arranged in a support 19 which is fixed adjustably on the table 2 by means of bolts 20—21 in oblong holes. On the lever 17 a weight 22 is arranged which by means of a screw 23 may be clamped and in this way may be displaced along the lever. The slot present in the weight 22 for taking up the lever 17 is open at its lower edge, so that the weight may easily be taken from the lever and also may be transported to the other end of the shaft.

A brush 13 is arranged at the end of a blade 15, the stirring blade 6 being provided with openings 24. It is self-evident that these and other constructive parts may be executed at will.

When actuating the device the stirring blade 6 is above the surface of the paint. The vessel 1 is caused to rotate and the stirring blade is loosened. By its weight the latter will sink until the surface 15 and the brush 13 rest upon the precipitated layer of paint. By rotating the vessel this paint is loosened and mixed with the liquid. This may be continued until the stirring blade, that is to say, the surface 15, rests upon the bottom or has sunk until it is just above the bottom. The brush may be sunk to the bottom and as soon as the bottom is fully cleaned the stirring blade may be arranged in the position in which the brush is just above the bottom, by the aid of an abutment 25, rotatably fixed at the table 2 and which in its vertical position supports the lever 17.

In order to increase the result of the stirring blade 6 blades 15 and 16 may be arranged to the same. The shape of the blade 15 has been chosen so that the precipitated paint when rotating the vessel rises against this blade and therefore is loosened from the rest. The blade 16 therefore in the first place serves for preventing the stirring blade to penetrate too quickly into the precipitating mass, while moreover an equal mixing of the same is promoted by rubbing out the paint as it was done in olden times by hand. In connection with these functions to be fulfilled the height of the blades 15 and 16 is also chosen.

When using very volatile paints a globe may be arranged over the whole device, provided with a hose-pipe or siphon by which the paint is led to a syringe or the like. It is self-evident that the paint may also be taken from the vessel in various other ways without the advantages obtained with the device being missed or decreased.

It is clear that the above embodiments are only given by way of example and that various other constructions are possible without leaving the principle of the invention.

I claim:

1. A paint mixing apparatus comprising a rotatable vessel carrying the solid and liquid elements of the paint, means for mixing said elements and arranged substantially stationary in a substantially horizontal plane, but reciprocable in a substantially vertical plane, and means mounted in a substantially horizontal plane for actuating said first-mentioned means.

2. A paint mixing apparatus comprising a rotatable vessel carrying the solid and liquid elements of the paint, means for mixing said elements and arranged substantially stationary in a substantially horizontal plane, but reciprocable in a substantially vertical plane, means mounted in a substantially horizontal plane for actuating said first-mentioned means, and means on said second-mentioned means for substantially counter-balancing said first-mentioned means.

3. A paint mixing apparatus comprising a rotatable vessel carrying the solid and liquid elements of the paint, means for mixing said elements and arranged substantially stationary in a substantially horizontal plane, but reciprocable in a substantially vertical plane, the said means comprising a brush and scraping blades, the brush and at least one blade being arranged substantially entirely at one side of the center of the vessel, and means mounted in a substantially horizontal plane for actuating said first-mentioned means.

4. A paint mixing apparatus comprising a rotatable vessel carrying the solid and liquid elements of the paint, means for mixing said elements and arranged substantially stationary in a substantially horizontal plane, but reciprocable in a substantially vertical plane, means mounted in a substantially horizontal plane for actuating said first-mentioned means and means adjustable on said second-mentioned means for substantially counter-balancing said first-mentioned means.

5. A paint mixing apparatus comprising a rotatable vessel carrying the solid and liquid elements of the paint, means for mixing said elements and arranged substantially stationary in a substantially horizontal plane, but reciprocable in a substantially vertical plane, means mounted in a substantially horizontal plane for actuating said first-mentioned means, means on said second-mentioned means for substantially counter-balancing said first-mentioned means, and means for determining the lowermost position of the said second-mentioned means and for supporting the same in that position.

6. A paint mixing apparatus comprising a rotatable vessel for holding the materials to be mixed, a substantially vertical mixing blade having perforations therein, and adapted for substantially rectilinear vertical movement, a brush and mixing blades on said first-mentioned blade, a lever for actuating said first-mentioned blade, a support in which the said lever is mounted for substantially horizontal pivotal movement, and a counter-balance movable along said lever for balancing said mixing blade.

7. A paint mixing apparatus comprising a rotatable vessel for holding the materials to be mixed, a substantially vertical mixing blade having perforations therein, and adapted for substantially rectilinear vertical movement, a brush and mixing blades on said first-mentioned blade, a lever for actuating said first-mentioned blade, a support in which the said lever is mounted for substantially horizontal pivotal movement, means in which said support is mounted for slight horizontal play, and a counter-balance movable along said lever for balancing said mixing blade.

8. A paint mixing apparatus comprising a rotatable vessel for holding the materials to be mixed, a substantially vertical mixing blade having perforations therein, and adapted for substantially rectilinear vertical movement, a brush and mixing blades on said first-mentioned blade, a lever for actuating said first-mentioned blade, a support in which the said lever is mounted for substantially horizontal pivotal movement, a pivotally mounted abutment for determining the lowermost position of the lever, and for supporting it in such position and a counter-balance movable along said lever for balancing said mixing blade.

9. A paint mixing apparatus comprising a rotatable vessel for holding the materials to be mixed, a work table having an opening in which said vessel is sunk substantially to its neck, a substantially vertical mixing blade perforations therein, and adapted for substantially rectilinear vertical movement, a brush and mixing blades on said first-mentioned blade, a lever for actuating said first-mentioned blade, a support in which the said lever is mounted for substantially horizontal pivotal movement, and a counter-balance movable along said lever for balancing said mixing blade.

10. The method of mixing the solid and liquid elements of a paint, comprising placing them in a vessel, rotating said vessel, placing a mixing element in said vessel, and moving said element gradually downwardly during the rotation of the vessel, and scraping up the precipitated solid element and dispersing it as a cloud through the liquid element.

11. A paint-mixing apparatus comprising a rotatable vessel carrying the solid and liquid elements of the paint, means for mixing said elements and arranged substantially stationary in a substantially horizontal plane but reciprocal in a substantially vertical plane, the said means comprising a brush for stirring the paint body, a downwardly-flared, quadrant shaped blade cooperating with said brush for breaking up the agitated paint, and a second blade arranged above and offset with respect to said first-mentioned blade, for preventing the latter from sinking too quickly into the mass as it precipitates, means mounted in a substantially horizontal plane for actuating said first-mentioned means, and means on said second-mentioned means for substantially counter-balancing said first-mentioned means.

12. A paint-mixing apparatus comprising a rotatable vessel carrying the solid and liquid elements of the paint, means for mixing said elements and arranged substantially stationary in a substantially horizontal plane but reciprocable in a substantially vertical plane, the said means comprising a brush arranged substantially entirely on one side of the center line of the vessel, for stirring the paint body, a downwardly-flared, quadrant shaped blade cooperating with said brush for breaking up the agitated paint, and a second blade arranged above and offset with respect to said first-mentioned blade, for preventing the latter from sinking too quickly into the mass as it precipitates, means mounted in a substantially horizontal plane for actuating said first-mentioned means, and means on said second-mentioned means for substantially counter-balancing said first-mentioned means.

13. A paint-mixing apparatus comprising a rotatable vessel carrying the solid and liquid elements of the paint, means for mixing said elements and arranged substantially stationary in a substantially horizontal plane but reciprocable in a substantially vertical plane, the said means comprising a brush arranged substantially entirely on one side of the center line of the vessel, for stirring the paint body, a downwardly-flared, quadrant shaped blade cooperating with said brush for breaking up the agitated paint, and a second blade arranged above and offset with respect to said first-mentioned blade, for preventing the latter from sinking too quickly into the mass as it precipitates, means mounted in a substantially horizontal plane for actuating said first-mentioned means, and means mounted on and adjustable longitudinally of said second-mentioned means for substantially counter-balancing said first-mentioned means, whereby the brush and its blades on said first-mentioned means are readily displaceable vertically.

In testimony whereof I affix my signature.

MAGNUS HANSEN.